United States Patent
Song et al.

(10) Patent No.: US 12,212,016 B2
(45) Date of Patent: Jan. 28, 2025

(54) BATTERY CELL AND ELECTRONIC APPARATUS HAVING SUCH BATTERY CELL

(71) Applicant: Ningde Amperex Technology Limited, Fujian (CN)

(72) Inventors: Chuantao Song, Fujian (CN); Rui Li, Fujian (CN); Haiyang Nan, Fujian (CN); Yisong Su, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 150 days.

(21) Appl. No.: 17/708,351

(22) Filed: Mar. 30, 2022

(65) Prior Publication Data

US 2022/0223973 A1   Jul. 14, 2022

Related U.S. Application Data

(63) Continuation of application No. PCT/CN2020/082119, filed on Mar. 30, 2020.

(51) Int. Cl.
 *H01M 50/375* (2021.01)
 *H01M 50/184* (2021.01)
 (Continued)

(52) U.S. Cl.
 CPC ....... *H01M 50/375* (2021.01); *H01M 50/184* (2021.01); *H01M 50/3425* (2021.01); *H01M 50/531* (2021.01)

(58) Field of Classification Search
 CPC ............ H01M 50/184; H01M 50/375; H01M 50/3425; H01M 50/531
 See application file for complete search history.

(56) References Cited

U.S. PATENT DOCUMENTS

| 7,125,627 | B2 | 10/2006 | Gu |
| 2003/0148173 | A1* | 8/2003 | Gu ...................... H01M 50/193 429/185 |

(Continued)

FOREIGN PATENT DOCUMENTS

| CN | 1328349 A | 12/2001 |
| CN | 1437273 A | 8/2003 |

(Continued)

OTHER PUBLICATIONS

Office Action issued on Mar. 1, 2022, in connection with corresponding Chinese Application No. 202080021672.4 (17 pp., including machine-generated English translation).

(Continued)

*Primary Examiner* — Matthew T Martin
*Assistant Examiner* — Unique Jenevieve Luna
(74) *Attorney, Agent, or Firm* — Maier & Maier, PLLC

(57) ABSTRACT

A battery cell includes an electrode assembly and a packaging bag, where the electrode assembly includes a tab, the packaging bag is configured to accommodate the electrode assembly, a sealing zone is formed on a periphery of the packaging bag, one end of the tab is electrically connected to a body of the electrode assembly, and an other end of the tab protrudes out of the sealing zone; the sealing zone is provided with a weak zone, and in a predetermined temperature range, a packaging tension of the weak zone in the packaging bag reduces to release gas inside the battery cell to the outside of the battery cell.

12 Claims, 7 Drawing Sheets

(51) Int. Cl.
*H01M 50/342* (2021.01)
*H01M 50/531* (2021.01)

(56) References Cited

U.S. PATENT DOCUMENTS

2006/0269839 A1* 11/2006 Asahina .............. H01M 50/529
   429/185
2013/0122336 A1  5/2013 Park et al.
2014/0011060 A1  1/2014 Yang et al.

FOREIGN PATENT DOCUMENTS

| CN | 1540779   | A | 10/2004 |
| CN | 1783545   | A | 6/2006  |
| CN | 2824297   | Y | 10/2006 |
| CN | 101904030 | A | 12/2010 |
| CN | 108039445 | A | 5/2018  |
| CN | 207690938 | U | 8/2018  |
| JP | 200193489 | A | 4/2001  |

OTHER PUBLICATIONS

International Search Report issued on Dec. 28, 2020 in corresponding International Patent Application No. PCT/CN2020/082119; 5 pages.
Extended European Search Report issued on Jun. 28, 2024, in corresponding European Application No. 20928718.4, 10 pages.

* cited by examiner

BATTERY CELL AND ELECTRONIC APPARATUS HAVING SUCH BATTERY CELL

CROSS-REFERENCE TO RELATED APPLICATIONS

This application is a Bypass Continuation application of International Application No. PCT/CN2020/082119, filed on Mar. 3, 2020 and entitled "BATTERY CELL AND ELECTRONIC APPARATUS HAVING SUCH BATTERY CELL", which is incorporated herein by reference in its entirety.

TECHNICAL FIELD

This application relates to the battery field, and in particular, to a battery cell and an electronic apparatus having such battery cell.

BACKGROUND

Currently, most electronic apparatuses on the market have built-in batteries to power them, and battery cells used by the market now all use a packaging bag to accommodate an electrode assembly. As the voltage and energy density of battery cells gradually increase, thermal stability of the battery cells gradually declines, with failures found in safety tests, indicating possible safety issues with the battery cells during use of electronic apparatuses by consumers, causing certain hazards.

SUMMARY

In view of the foregoing situation, it is necessary to provide a battery cell and an electronic apparatus having such battery cell, in order to mitigate safety issues with battery cells.

Embodiments of this application provide a battery cell, including an electrode assembly and a packaging bag configured to accommodate the electrode assembly, where the electrode assembly includes a tab; a sealing zone is formed on a periphery of the packaging bag, one end of the tab is electrically connected to a body of the electrode assembly, and an other end of the tab protrudes out of the sealing zone; the sealing zone is provided with a weak zone, and in a predetermined temperature range, a packaging tension between the weak zone and the packaging bag reduces to release gas inside the battery cell to the outside of the battery cell.

According to some embodiments of this application, the packaging tension is defined as F (measured in N/6 mm) and temperature as T, and F and T in the weak zone satisfy the following relation: $F=(0.5-f)\times T/20+6.5\times f-2.75$. Parameters in this relation are calculated numerically, where $110°\text{ C.}\leq T\leq 130°\text{ C.}$ and $4.5\text{N}/6\text{ mm}\leq f\leq 5.5\text{N}/6\text{ mm}$.

According to some embodiments of this application, the battery cell further includes a first sealing adhesive and a second sealing adhesive provided between the tab and the packaging bag, where the tab is provided between the first sealing adhesive and the second sealing adhesive, the weak zone is formed through thermal fusion of the second sealing adhesive and the packaging bag, and a thickness of the first sealing adhesive or the second sealing adhesive is greater than 25 μm.

According to some embodiments of this application, the first sealing adhesive includes a first adhesive layer and a second adhesive layer, where the first adhesive layer is provided between the second adhesive layer and the packaging bag, the second adhesive layer is provided between the first adhesive layer and the tab, and in a predetermined temperature range, a packaging tension between the first adhesive layer and the packaging bag or the second adhesive layer is less than packaging tension between the second adhesive layer and the tab.

According to some embodiments of this application, the first sealing adhesive includes a first adhesive layer and a second adhesive layer, where the first adhesive layer is provided between the second adhesive layer and the tab, the second adhesive layer is provided between the first adhesive layer and the packaging bag, and in a predetermined temperature range, a packaging tension between the first adhesive layer and the tab or the second adhesive layer is less than a packaging tension between the second adhesive layer and the packaging bag.

According to some embodiments of this application, a total thickness of the first adhesive layer and the second adhesive layer is greater than or equal to 25 μm, and less than or equal to 100 μm, and a thickness of the first adhesive layer or the second adhesive layer is greater than 10 μm.

According to some embodiments of this application, the first sealing adhesive includes a first adhesive layer, a second adhesive layer, and a third adhesive layer that are arranged in order, where the first adhesive layer is provided between the second adhesive layer and the packaging bag, the third adhesive layer is provided between the second adhesive layer and the tab, and in a predetermined temperature range, a packaging tension between the first adhesive layer and the packaging bag is less than a packaging tension between the second adhesive layer and the first adhesive layer or the third adhesive layer, and a packaging tension between the third adhesive layer and the tab is less than a packaging tension between the second adhesive layer and the first adhesive layer or the third adhesive layer.

According to some embodiments of this application, a total thickness of the first adhesive layer, the second adhesive layer, and the third adhesive layer is greater than or equal to 25 μm and less than or equal to 100 μm, and a thickness of the first adhesive layer, the second adhesive layer, or the third adhesive layer is greater than 10 μm.

According to some embodiments of this application, the weak zone is provided in the sealing zone in a location other than where the tab protrudes out.

Embodiments of this application further provide an electronic apparatus, including a battery, where the battery includes a battery cell and a housing accommodating the battery cell, and the battery cell includes the foregoing battery cell.

In the foregoing battery cell and the electronic apparatus having such battery cell, a sealing zone of a packaging bag is provided with a weak zone, and a packaging tension of the weak zone in the packaging bag reduces in a predetermined temperature range, so as to release heated gas generated inside the battery cell to the outside of the battery cell through the weak zone, reduce heat accumulated inside the battery cell, and alleviate deformation of the battery cell, thereby greatly improving safety performance of the battery cell.

REFERENCE SIGNS OF MAIN COMPONENTS

| Battery cell | 100 |
| Electrode assembly | 10 |
| Electrode assembly body | 11 |
| Tab | 12 |
| Positive tab | 121 |
| Negative tab | 122 |
| Packaging bag | 20 |
| Sealing zone | 30 |
| Packaging zone | 31 |
| Weak zone | 32 |
| First sealing adhesive | 321 |
| First adhesive layer | 3211 |
| Second adhesive layer | 3212 |
| Third adhesive layer | 3213 |
| Second sealing adhesive | 322 |

DETAILED DESCRIPTION

The following clearly describes the technical solutions in the implementations of this application with reference to the accompanying drawings in the implementations of this application. Apparently, the described implementations are some but not all of the implementations of this application. All other embodiments obtained by a person of ordinary skill in the art based on the embodiments of this application without creative efforts shall fall within the protection scope of this application.

It should be noted that when an element is referred to as being "fastened" to another element, it may be directly fastened to the another element or an intermediate element may be present. When an element is considered to be "connected" to another element, it may be directly connected to the another element or an intermediate element may be present. When an element is considered to be "provided" at another element, it may be directly disposed at the another element or an intermediate element may be present. The terms "vertical", "horizontal", "left", "right", and similar expressions used herein are merely for description purposes.

Unless otherwise defined, all technical and scientific terms used herein shall have the same meanings as commonly understood by those skilled in the art to which this application belongs. The terms used in the specification of this application are merely intended to describe specific embodiments but not intended to constitute any limitation on this application. The term "and/or" used herein includes any and all combinations of one or more relevant listed items.

This application provides a battery cell, where the battery cell includes an electrode assembly and a packaging bag configured to accommodate the electrode assembly, where the electrode assembly includes a tab, a sealing zone is formed on a periphery of the packaging bag, one end of the tab is electrically connected to a body of the electrode assembly, and an other end of the tab protrudes out of the sealing zone. The sealing zone is provided with a weak zone, and in a predetermined temperature range, a packaging tension of the weak zone in the packaging bag reduces to release gas inside the battery cell to the outside of the battery cell.

Figure 1:
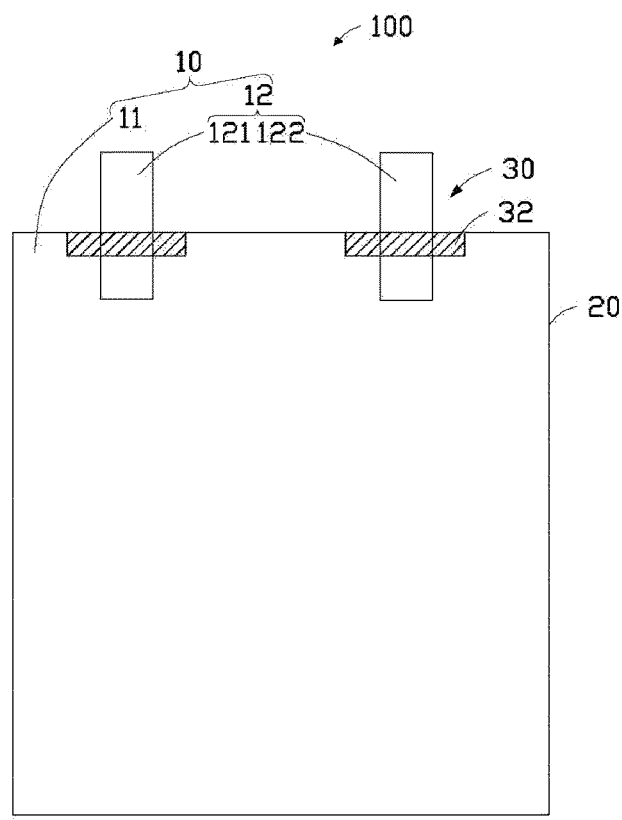
FIG. 1 is a sectional view of a battery cell in a first embodiment of this application.
Figure 2:
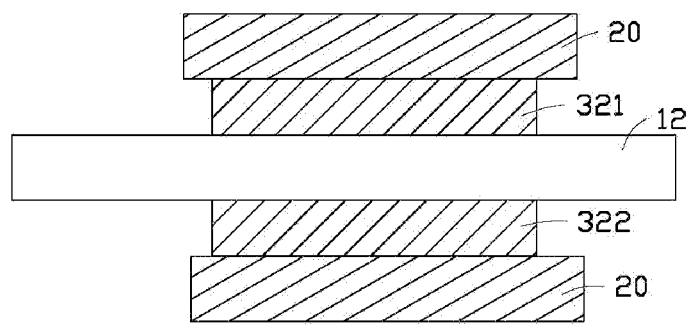
FIG. 2 is a sectional view of a tab portion of the battery cell in FIG. 1.

Referring to FIG. 1 and FIG. 2, a first embodiment of this application provides a battery cell 100. The battery cell 100 includes an electrode assembly 10 and a packaging bag 20. The packaging bag 20 wraps the electrode assembly 10. The packaging bag 20 seals and accommodates the electrode assembly 10 through a sealing zone 30 on a periphery of the packaging bag 20.

Specifically, the electrode assembly 10 includes an electrode assembly body 11 and a tab 12 electrically connected to the electrode assembly body 11. The tab 12 is provided in one end surface of the electrode assembly body 11.

The packaging bag 20 is configured to accommodate the electrode assembly body 11, where one end of the tab 12 connected to the electrode assembly body 11 is wrapped by the sealing zone 30, and an other end of the tab 12 is left protruding out of the sealing zone 30 to expose the packaging bag 20.

The sealing zone 30 includes a weak zone 32. One end of the tab 12 protrudes out of the weak zone 32. When temperature rises to within a particular range, a packaging tension of the weak zone 32 drops rapidly, so that under this temperature range, gas generated by the electrode assembly body 11 is released outside the packaging bag through the weak zone 32. Thus, temperature of the electrode assembly body 11 and deformation of the battery cell can be reduced to avoid safety issues such as short circuit and even fire. In some embodiments, the temperature ranges from 110° C. to 130° C. and may be adjusted depending on actual needs.

According to some embodiments of this application, the packaging tension in the weak zone 32 is defined as F (measured in N/6 mm) which has the following relation with temperature T: $F=(0.5-f)\times T/20+6.5\times f-2.75$, where 110° C.$\leq$T$\leq$130° C. and 4.5N/6 mm$\leq$f$\leq$5.5N/6 mm Parameters in this relation are calculated numerically. When the temperature is lower than 110° C., a packaging tension of the weak zone 32 is roughly the same as a packaging tension of other parts of the packaging zone, so gas cannot be released to the outside through the weak zone 32. When the temperature rises to or above 130° C., a packaging tension of the weak zone 32 drops rapidly to nearly disappear while a packaging tension of other parts of the packaging zone remains roughly unchanged, so that the weak zone 32 is forced to open by gas inside the battery cell to ensure safety performance of the battery cell.

Specifically, the battery cell 100 includes a first sealing adhesive 321 and a second adhesive 322. Two sides of the tab 12 are bonded by the first sealing adhesive 321 and the second sealing adhesive 322 respectively, and the bonded combination are hot pressed with part of the packaging bag 20 to form the weak zone 32.

In some embodiments, the first sealing adhesive 321 and the second sealing adhesive 322 each consist of one adhesive layer. When a temperature of the adhesive layer rises to 110° C. to 130° C., a packaging tension between the first sealing adhesive 321 or the second sealing adhesive 322 and the packaging bag 20 and the tab 12 that are on two sides of the adhesive layer drops rapidly.

In some embodiments, the first sealing adhesive 321 and the second sealing adhesive 322 both have a thickness greater than 25 μm. Preferably, a thickness of the first sealing adhesive 321 and the second sealing adhesive 322 are both 30 μm.

Figure 3:
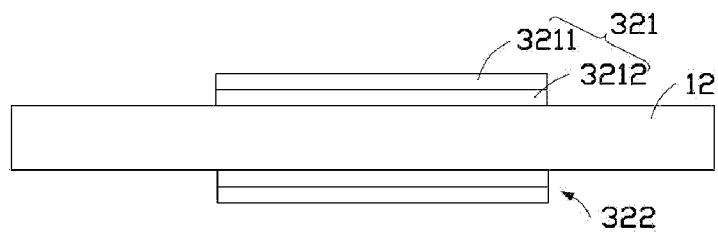
FIG. 3 is a sectional view of a tab of a battery cell in a second embodiment of this application.

Also referring to FIG. 3, which shows the tab 12 of the battery cell 100 in a second embodiment of this application. Different from the first embodiment, the first sealing adhesive 321 and the sealing adhesive 322 each includes two adhesive layers.

Specifically, the first sealing adhesive 321 includes a first adhesive layer 3211 and a second adhesive layer 3212. The first adhesive layer 3211 is provided between the second adhesive layer 3212 and the packaging bag 20, and the second adhesive layer 3212 is provided between the first adhesive layer 3211 and the tab 12. A packaging tension of the first adhesive layer 3211 satisfies a foregoing relation between a packaging tension and temperature in the weak zone 32. A packaging tension change of the second adhesive layer 3212 is roughly the same as packaging tension change in other parts of the packaging zone.

Therefore, when temperature rises to 110° C. to 130° C., a packaging tension between the first adhesive layer 3211 and the packaging bag 20 or the second adhesive layer 3212 rapidly drops, while a packaging tension between the second adhesive layer 3212 and the tab 12 remains unchanged, so that a packaging tension weak zone 32 exists between the first adhesive layer 3211 and the packaging bag 20 or the second adhesive layer 3212, allowing heated gas generated by the electrode assembly body 11 to release.

In some embodiments, the second sealing adhesive 322 and the third sealing adhesive 321 may have a same structure.

In some embodiments, a total thickness of the first adhesive layer 3211 and the second adhesive layer 3212 ranges from 25 μm to 100 μm, and the first adhesive layer 3211 and the second adhesive layer 3212 both have a thickness greater than 10 μm. Preferably, the first adhesive layer 3211 and the second adhesive layer 3212 are both 15 μm thick.

It can be understood that the second sealing adhesive 322 may alternatively be the same as the second sealing adhesive 322 in the first embodiment. On the contrary, the first sealing adhesive 321 may be the same as the first sealing adhesive 321 in the first embodiment, and the second sealing adhesive 322 may consist of two adhesive layers.

Figure 4:
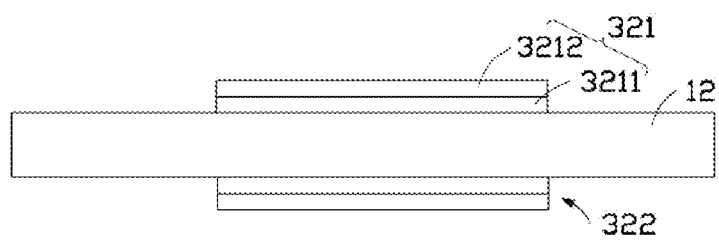
FIG. 4 is a sectional view of a tab of a battery cell in a third embodiment of this application.

Also referring to FIG. 4, which shows the tab 12 of the battery cell 100 in a third embodiment of this application. Different from the first embodiment, the first sealing adhesive 321 and the sealing adhesive 322 each consist of two adhesive layers. Different from the second embodiment, the two adhesive layers are arranged in reverse order.

Specifically, the first sealing adhesive 321 includes a first adhesive layer 3211 and a second adhesive layer 3212. The first adhesive layer 3211 is provided between the second adhesive layer 3212 and the tab 12, and the second adhesive layer 3212 is provided between the first adhesive layer 3211 and the packaging bag 20. A packaging tension of the first adhesive layer 3211 satisfies the foregoing relation between a packaging tension and temperature in the weak zone 32. Tension change of the second adhesive layer 3212 is roughly the same as tension change in other parts of the packaging zone.

Therefore, when temperature rises to 110° C. to 130° C., a packaging tension between the first adhesive layer 3211 and the tab 12 or the second adhesive layer 3212 rapidly drops, while a packaging tension between the second adhesive layer 3212 and the packaging bag 20 remains unchanged, so that a packaging tension weak zone 32 exists between the first adhesive layer 3211 and the tab 12 or the second adhesive layer 3212, allowing heated gas generated by the electrode assembly body 11 to release.

In some embodiments, the first sealing adhesive 322 and the second sealing adhesive 321 may have a same structure.

In some embodiments, a total thickness of the first adhesive layer 3211 and the second adhesive layer 3212 ranges from 25 μm to 100 μm, and the first adhesive layer 3211 and the second adhesive layer 3212 both have a thickness greater than 10 μm. Preferably, a thickness of the first adhesive layer 3211 and the second adhesive layer 3212 are both 15 μm.

It can be understood that the second sealing adhesive 322 may alternatively be the same as the second sealing adhesive 322 in the first embodiment or the second embodiment. On the contrary, the first sealing adhesive 321 may be the same as the first sealing adhesive 321 in the first embodiment or the second embodiment, and the second sealing adhesive 322 may include two adhesive layers.

Figure 5:
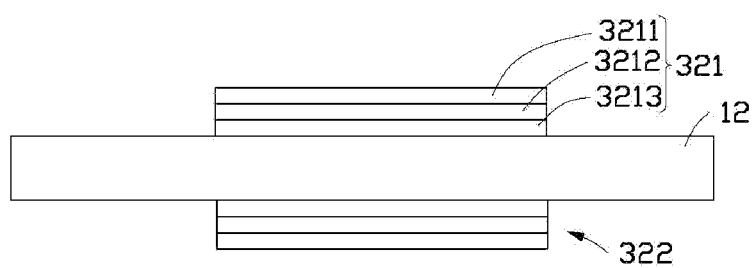
FIG. 5 is a sectional view of a tab of a battery cell in a fourth embodiment of this application.

Also referring to FIG. 5, which shows the tab 12 of the battery cell 100 in a fourth embodiment of this application. Different from the first embodiment, the first sealing adhesive 321 and the second sealing adhesive 322 each include three adhesive layers.

Specifically, the first sealing adhesive 321 includes a first adhesive layer 3211, a second adhesive layer 3212, and a third adhesive layer 3213. The first adhesive layer 3211 is provided between the second adhesive layer 3212 and the packaging bag 20, and the second adhesive layer 3212 is provided between the first adhesive layer 3211 and the third adhesive layer 3213. The third adhesive layer 3213 is provided between the second adhesive layer 3212 and the tab 12. A packaging tension of the first adhesive layer 3211 and the third adhesive layer 3213 satisfies the foregoing relation between a packaging tension and temperature in the weak zone 32. Tension change of the second adhesive layer 3212 is roughly the same as tension change in other parts of the packaging zone.

Therefore, when temperature rises to 110° C. to 130° C., a packaging tension between the first adhesive layer 3211 and the packaging bag 20 rapidly drops, and a packaging tension between the third adhesive layer 3213 and the tab 12 rapidly drops, while a packaging tension between the second adhesive layer 3212 and the first adhesive layer 3211 and that between the second adhesive layer 3212 and the third adhesive layer 3213 remain unchanged or slightly reduces, so a packaging tension weak zone 32 exists between the first adhesive layer 3211 and the packaging bag 20 or between the third adhesive layer 3213 and the tab 12, allowing heated gas generated by electrode assembly body 11 to release.

In some embodiments, the first sealing adhesive 322 and the second sealing adhesive 321 may have a same structure.

In some embodiments, a total thickness of the first adhesive layer 3211, the second adhesive layer 3212 and the third adhesive layer 3213 ranges from 25 μm to 100 μm, and the first adhesive layer 3211, the second adhesive layer 3212 and the third adhesive layer 3213 all have a thickness greater than 10 μm. Preferably, the first adhesive layer 3211, a thickness of the second adhesive layer 3212 and the third adhesive layer 3213 are all 13 μm.

It may be understood that the second sealing adhesive 322 may alternatively be the same as the second sealing adhesive 322 in the first, second or third embodiment. On the contrary, the first sealing adhesive 321 may be the same as the first sealing adhesive 321 in the first, second or third embodiment, and the second sealing adhesive 322 may consist of three adhesive layers.

It may be understood that a packaging tension of the second adhesive layer 3212 may further satisfy the foregoing relation between a packaging tension and temperature in the weak zone 32, and correspondingly, tension change of the first adhesive layer 3211 and the third adhesive layer 3213 is roughly the same as tension change in other parts of the packaging zone.

Figure 6:
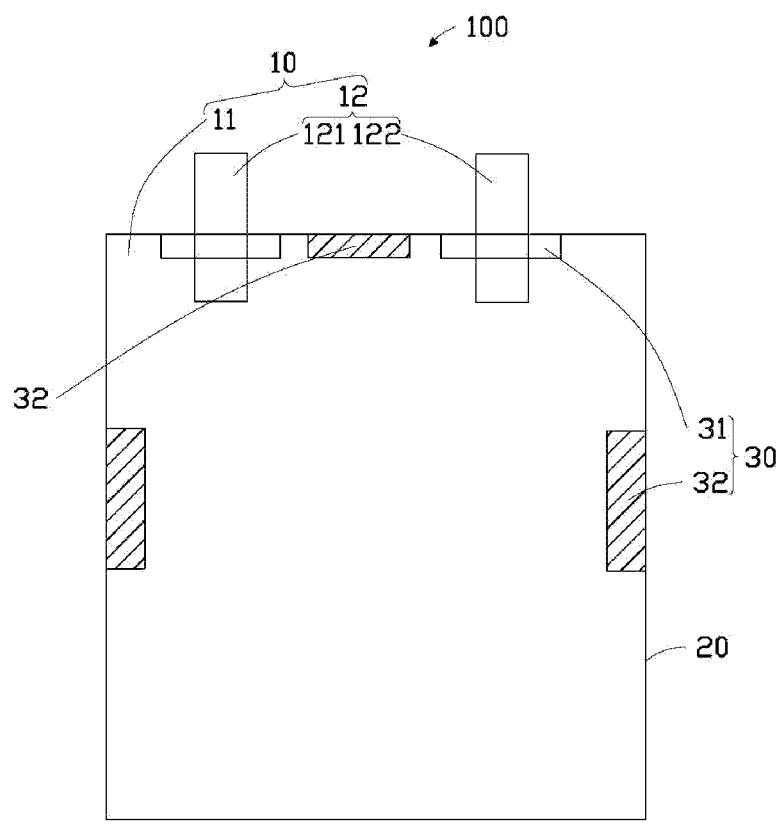
FIG. 6 is a sectional view of a battery cell in a fifth embodiment of this application.
Figure 7:
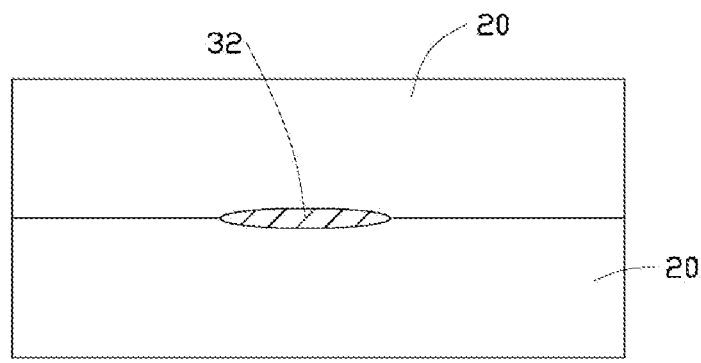
FIG. 7 is a sectional view of a weak zone in the battery cell in FIG. 6.

Referring to FIG. 6 and FIG. 7, which show the battery cell 100 in a fifth embodiment of this application. Different from the first embodiment, the tab 12 is packaged by a packaging zone 31 of the sealing zone 30. Other parts of the sealing zone 30 of the packaging bag 20 include a weak zone 32.

Specifically, the weak zone 32 bonds to two sides of the packaging bag 20. When temperature rises to 110° C. to 130° C., a packaging tension between the weak zone 32 and the packaging bag 20 on two sides of the weak zone 32 rapidly drops, so that package of the packaging bag 20 fails to function, thus allowing heated gas generated by the electrode assembly body 11 to release through the weak zone 32.

In some embodiments, the tab 12 includes a positive tab 121 and a negative tab 122, where the positive tab 121 may be made of aluminum, and the negative electrode tab 122 may be made of nickel. The positive tab 121 and the negative tab 122 are provided opposite each other on an end surface of the electrode assembly body 11.

The first sealing adhesive 321 and the second sealing adhesive 322 in the first embodiment, the first adhesive layer 3211 in the second and the third embodiments, the first adhesive layer 3211 and the third adhesive layer 3213 in the fourth embodiment and the weak zone 32 in the fifth embodiment may all be made by adjusting a ratio of polypropylene (PP) adhesive and polyethylene (PE) adhesive, for example, by mixing PP adhesive and PE adhesive in a ratio of 1:1. Alternatively, they may be made by mixing PP adhesive and a material with an expansion coefficient significantly different from that of PP adhesive when the temperature is higher than 110° C.

A packaging tension test was performed on an adhesive mixture of PP adhesive and PE adhesive in a ratio of 1:1 and a conventional packaging adhesive.

Example: a battery cell with a tab packaged by an adhesive mixture of PP adhesive and PE adhesive in a ratio of 1:1.

Comparative Example: a battery cell with a tab package by a conventional adhesive.

The packaged batteries in the example and the comparative example were clamped on a tensile machine, and kept at different temperatures for 5 minutes before start of the tension test. Results of the test were: a packaging tension of the battery in the example dropped rapidly at the temperature from 110° C. to 130° C.; while a packaging tension of the battery in the comparative example did not drop until the temperature was above 150° C. (conventional packaging adhesives all cease to function at 150° C.).

The embodiments of this application further provide an electronic apparatus, including a battery, where the battery includes a battery cell 100 and a housing accommodating the battery cell 100, and the battery cell includes any one of the foregoing battery cells in the foregoing embodiments.

In the foregoing battery cell 100 and the electronic apparatus having such battery cell 100, a sealing zone 32 of a packaging bag 20 is provided with a weak zone 32, and a packaging tension of the weak zone 32 in the packaging bag 20 reduces in a predetermined temperature range, so as to release heated gas generated inside the battery cell 100 to the outside of the battery cell 100 through the weak zone 32 when heat accumulates inside the battery cell 100, thereby reducing heat accumulated inside the battery cell 100 and alleviating deformation of the battery cell, which greatly improves safety performance of the battery cell and avoids safety issues such as short circuit and even fire.

The foregoing embodiments are merely intended to describe the technical solutions of this application, but not intended to constitute any limitation. Although this application is described in detail with reference to exemplary embodiments, persons of ordinary skill in the art should understand that modifications or equivalent replacements can be made to the technical solutions of this application, without departing from the spirit and essence of the technical solutions of this application.

What is claimed is:

1. A battery cell, comprising:
   an electrode assembly comprising a tab; and
   a packaging bag configured to accommodate the electrode assembly, wherein a sealing zone is formed on a periphery of the packaging bag, one end of the tab is electrically connected to a body of the electrode assembly, and an other end of the tab protrudes out of the sealing zone;
   wherein,
   the sealing zone is provided with a weak zone, and in a predetermined temperature range of 110° C. to 130° C., a packaging tension between the weak zone and the packaging bag reduces to a level lower than a packaging tension in other parts of the sealing zone, releasing gas inside the battery cell to the outside of the battery cell;
   the battery cell further comprising a first sealing adhesive and a second sealing adhesive provided between the tab and the packaging bag, wherein the tab is provided between the first sealing adhesive and the second sealing adhesive, the first sealing adhesive and the second sealing adhesive are thermally fused to the packaging bag to form the weak zone;
   the first sealing adhesive comprises a first adhesive layer, a second adhesive layer, and a third adhesive layer, wherein the first adhesive layer is provided between the second adhesive layer and the packaging bag, the third adhesive layer is provided between the second adhesive layer and the tab; and in the predetermined temperature range of 110° C. to 130° C., a packaging tension between the first adhesive layer and the packaging bag is less than a packaging tension between the second adhesive layer and the first adhesive layer or the third adhesive layer, and a packaging tension between the third adhesive layer and the tab is less than a packaging tension between the second adhesive layer and the first adhesive layer or the third adhesive layer; and
   the second sealing adhesive comprises a fourth adhesive layer, a fifth adhesive layer, and a sixth adhesive layer, wherein the fourth adhesive layer is provided between the fifth adhesive layer and the packaging bag, the sixth adhesive layer is provided between the fifth adhesive layer and the tab; and in the predetermined temperature range of 110° C. to 130° C., a packaging tension between the fourth adhesive layer and the packaging bag is less than a packaging tension between the fifth adhesive layer and the fourth adhesive layer or the sixth adhesive layer, and a packaging tension between the sixth adhesive layer and the tab is less than a packaging tension between the fifth adhesive layer and the fourth adhesive layer or the sixth adhesive layer.

2. The battery cell according to claim 1, wherein the packaging tension is defined as F N/6 mm and temperature as T° C., and the F and T in the weak zone satisfy the following relation: $F=(0.5-f)\ T/20+6.5f-2.75$, wherein $110 \leq T \leq 130$ and $4.5 \leq f \leq 5.5$.

3. The battery cell according to claim 1, wherein a thickness of the first sealing adhesive or the second sealing adhesive is greater than 25 μm.

4. The battery cell according to claim 3, wherein a thickness of the first adhesive layer or the second adhesive layer is greater than 10 μm.

5. The battery cell according to claim 3, wherein a total thickness of the first adhesive layer, the second adhesive layer, and the third adhesive layer is greater than or equal to 25 μm and less than or equal to 100 μm, and a thickness of the first adhesive layer, the second adhesive layer, or the third adhesive layer is greater than 10 μm.

6. The battery cell according to claim 1, wherein the weak zone is provided in the sealing zone in a location other than where the tab protrudes out.

7. An electronic apparatus, comprising a battery, the battery comprising a battery cell and a housing accommodating the battery cell, the battery cell comprising:
an electrode assembly comprising a tab; and
a packaging bag configured to accommodate the electrode assembly, wherein a sealing zone is formed on a periphery of the packaging bag, one end of the tab is electrically connected to a body of the electrode assembly, and an other end of the tab protrudes out of the sealing zone;
wherein,
the sealing zone is provided with a weak zone, and in a predetermined temperature range of 110° C. to 130° C., a packaging tension between the weak zone and the packaging bag reduces to a level lower than a packaging tension in other parts of the sealing zone, releasing gas inside the battery cell to the outside of the battery cell;
the battery cell further comprising a first sealing adhesive and a second sealing adhesive provided between the tab and the packaging bag, wherein the tab is provided between the first sealing adhesive and the second sealing adhesive, the first sealing adhesive and the second sealing adhesive are thermally fused to the packaging bag to form the weak zone;
the first sealing adhesive comprises a first adhesive layer, a second adhesive layer, and a third adhesive layer, wherein the first adhesive layer is provided between the second adhesive layer and the packaging bag, the third adhesive layer is provided between the second adhesive layer and the tab; and in the predetermined temperature range of 110° C. to 130° C., a packaging tension between the first adhesive layer and the packaging bag is less than a packaging tension between the second adhesive layer and the first adhesive layer or the third adhesive layer, and a packaging tension between the third adhesive layer and the tab is less than a packaging tension between the second adhesive layer and the first adhesive layer or the third adhesive layer; and
the second sealing adhesive comprises a fourth adhesive layer, a fifth adhesive layer, and a sixth adhesive layer, wherein the fourth adhesive layer is provided between the fifth adhesive layer and the packaging bag, the sixth adhesive layer is provided between the fifth adhesive layer and the tab; and in the predetermined temperature range of 110° C. to 130° C., a packaging tension between the fourth adhesive layer and the packaging bag is less than a packaging tension between the fifth adhesive layer and the fourth adhesive layer or the sixth adhesive layer, and a packaging tension between the sixth adhesive layer and the tab is less than a packaging tension between the fifth adhesive layer and the fourth adhesive layer or the sixth adhesive layer.

8. The electronic apparatus according to claim 7, wherein the packaging tension is defined as F N/6 mm and temperature as T° C., and the F and T in the weak zone satisfy the following relation: $F=(0.5-f)\ T/20+6.5f-2.75$, wherein $110 \leq T \leq 130$ and $4.5 \leq f \leq 5.5$.

9. The electronic apparatus according to claim 7, wherein a thickness of the first sealing adhesive or the second sealing adhesive is greater than 25 μm.

10. The electronic apparatus according to claim 9, wherein a thickness of the first adhesive layer or the second adhesive layer is greater than 10 μm.

11. The electronic apparatus according to claim 9, wherein a total thickness of the first adhesive layer, the second adhesive layer, and the third adhesive layer is greater than or equal to 25 μm and less than or equal to 100 μm, and a thickness of the first adhesive layer, the second adhesive layer, or the third adhesive layer is greater than 10 μm.

12. The electronic apparatus according to claim 7, wherein the weak zone is provided in the sealing zone in a location other than where the tab protrudes out.

* * * * *